United States Patent [19]
Nishitani

[11] Patent Number: 5,675,316
[45] Date of Patent: Oct. 7, 1997

[54] METER-MODULE AND ITS ASSEMBLY

[75] Inventor: Keizo Nishitani, Shizuoka, Japan

[73] Assignee: Yazaki Corporation, Tokyo, Japan

[21] Appl. No.: 401,977

[22] Filed: Mar. 10, 1995

[30] Foreign Application Priority Data

Mar. 11, 1994 [JP] Japan ................. 6-040902

[51] Int. Cl.⁶ ...................................... B60Q 1/00
[52] U.S. Cl. .................... 340/461; 361/647; 361/735; 439/34; 307/10.1
[58] Field of Search ....................... 361/647, 732, 361/747, 748, 752, 785, 735, 644; 307/10.1; 248/27.3; 439/34; 340/461

[56] References Cited

U.S. PATENT DOCUMENTS

| | | | |
|---|---|---|---|
| 4,929,182 | 5/1990 | Hyogo et al. | 439/34 |
| 4,943,241 | 7/1990 | Watanabe et al. | 439/34 |
| 5,324,203 | 6/1994 | Sano et al. | 439/34 |
| 5,353,190 | 10/1994 | Nakayama et al. | 361/647 |
| 5,502,615 | 3/1996 | Kubota et al. | 361/735 |

FOREIGN PATENT DOCUMENTS

| | | |
|---|---|---|
| 57-38457 | 8/1982 | Japan . |
| 2-45238 | 2/1990 | Japan . |
| 4-266537 | 9/1992 | Japan . |

Primary Examiner—Jeffery Hofsass
Assistant Examiner—Mark S. Rushing
Attorney, Agent, or Firm—Armstrong, Westerman, Hattori, McLeland & Naughton

[57] ABSTRACT

A meter-module is compactly and integrally formed by a combination meter 1, an electric junction box 2 and a switching unit 3. Meters and indication lamps are mounted on the combination meter 1. A circuitry for controlling module components is incorporated into the electric junction box 2. Various kinds of switches are incorporated into the switch unit 3. Connectors 6, 6' and 8 and so forth, are provided for the outer wall 2a of the electric junction box 2 and electrical connection is carried out between the connectors thereof and connectors in respect to both the combination meter 1 and the switch unit 3. The combination meter 1, the electric junction box 2 and the switch unit 3 are removably integrated by engaging guide grooves 5, 5' of the electric junction box 2 with a guide projection 11 of the combination meter 1.

3 Claims, 11 Drawing Sheets

METER-MODULE AND ITS ASSEMBLY

BACKGROUND OF THE INVENTION

1. Field of the Invention

The present invention relates to a meter-module and its assembly in which electric wiring of the instrument panel in a motor vehicle and assembly of electric devices can be easily performed.

2. Description of the Prior Art

In general, several pieces of electrical equipment are arranged in the vicinity of an instrument panel of a motor vehicle. A control circuitry unit for controlling and monitoring such electrical equipment, as well as meters, indication lamps and various switches, are also crowdedly arranged. Therefore, instrument wiring harnesses for connecting such items must be composed of a large number of electric wiring lines. As a result, the wiring harnesses, which are of significant quantity and weight, become complicated in wiring configuration. Accordingly, excessive labor and time is spent in assembling the wiring arrangement. Also, it is difficult to perform maintenance thereon.

In order to alleviate such a situation, as disclosed in the Japanese Patent Publication No. 57-38485, a plurality of electric junction boxes are disposed in suitable positions of a motor vehicle, incorporating a branch junction part of the wiring harness. The junction boxes are equipped with many electrical fuses as circuitry protection elements, together with relays as control elements. Simplification of the wiring configuration for the wiring harness and prevention of further increases therein are proposed.

FIG. 10 is a wiring diagram of a tail-lamp system using such conventional electric junction box. Designated at B is a body, 25A and 25B are tail-lamps, 26A and 26B are clearance-lamps, and 29 is an engine. A battery (not illustrated) is installed in an engine space 29A. In the vicinity of an instrument panel 30, there is provided a combination meter 32 having an alarm-lamp 31 for the tail-lamp, a tail-relay 27, a main-fuse 28A, tail-fuse 28B, the electric junction box 33 with meter-fuse 28C, a lamp cut-off detecting relay 34 and tail-switch 35.

When the tail-switch 35 is turned on, lamps 25A, 25B, 26A, and 26B light up because the circuit having the tail-fuse 28B is energized by virtue of closing the point of contact for tail-relay 27. In case that any of the lamps 25A and 25B are cut off, the alarm lamp 31 lights up by virtue of actuation of the lamp cut-off detecting relay 34.

FIG. 11 is a block diagram illustrating the wiring existing in the vicinity of the combination meter 32 joined together with the control circuitry in the tail relay unit 27, including the above electric junction box 33, the lamp cut-off detecting relay 34, a speed control relay, an integration relay, etc.

Within the combination meter 32 are mounted several meters 36, such as an oil meter, a battery meter, a speed meter, a tachometer, and so on, and a sensor 37 thereof, as well as various types of lamps, such as indicators, alarms, lightings, and so on. Exclusive control circuitry elements 38A and 38B are individually provided for the speed meter 36A and tachometer 36B, respectively. Further, some kinds of controlling circuitry units 27, such as the speed controlling relay and the integration relay, and so on, are also disposed in the concerned region. Thus, there are many power wires and signal wires for interconnecting the respective equipment. Consequently, a complicated condition of the equipment and wiring therefor is unchanged regardless of the use of a more restricted number of electric junction boxes 33.

As disclosed in the Japanese Patent Application Laid Open No. 2-45238, there is provided a branch circuit having a joint junction part for connecting the combination meter with the wiring harness in the internal circuitry of the combination meter. Such branch circuit incorporates a portion of the branch junction part of the wiring harness so that the wiring harness in the vicinity of the instrument panel is simplified by reducing both the number of circuits on the inside of the electric junction box and the number of connecting electric wires.

Further, as shown in FIG. 12 herein, Japanese Patent Application Laid Open No. 4-266537 provides a circuit construction in which some switches and instruments (not illustrated) are mounted on the instrument cluster 40 of the instrument panel 39, and a flexible printed wiring board 41, which constitutes an electric circuit thereof, is mounted on the rear of the instrument cluster 40. The switches, the memories for electronic control of the instruments, and the electronic functional parts for calculating are arranged and distributed about the electronic control substrates 42A–43F which are connected to the terminal parts of the flexible printed wiring board.

Even if the wiring harness or a part of the branch circuit for an electric junction box is subrogated by the internal circuit of the instrument panel, as long as the circuitry control units continue to be individually arranged and distributed, the simplification of the wiring harness has a limitation. Consequently, the promotion, by electronic means, of motor vehicle safety and the pursuit of riding comfort therein is difficult to achieve.

There is great advantage in installing the controlling circuitry unit into the rear of the instrument cluster in such a way that the electric circuit (flexible printed wiring board) corresponding to each of the switches and instruments and the electronic control substrate are directly arranged and distributed. However, this is technologically difficult to achieve because the electric circuit (flexible printed wiring board) and the electronic control substrate must be made to accommodate irregularities on the rear of the instrument cluster. Since design and production differ for various types, grades or models of motor vehicles, the costs attendant with minor production changes readily increase.

Furthermore, in the process of assembling, since it is necessary to provide an exclusive production line, there is a problem that productivity deteriorates.

SUMMARY OF THE INVENTION

In view of the foregoing, it is an object of the present invention to provide a meter-module assembly which makes simple an addition of motor vehicle-on-board electric instruments and a handling of different types of motor vehicles and various grades thereof. A wiring configuration in the vicinity of an instrument panel can be remarkably simplified, and thereby a wiring and assembling thereof are easily performed.

According to one aspect of the present invention, there is provided a meter-module assembly comprising a combination meter including meters, indicators, lamps and driving circuits thereof, an electric junction box including a power source for motor vehicle-on-board electric instruments and circuitry means for allocating the input and output signals and for control thereof, and a switch-unit including switches of motor vehicle-on-board electric instruments whereby said combination meter, said electric junction box and said switch unit are compactly and integrally formed. Connectors, which are connected to different connectors of both the combination meter and the switch unit, are provided on the outer wall of the electric junction box in such a manner that the connecting direction of the connectors is linear and in an identical direction. The circuitry means including the meter and indication lamp, etc. is incorporated into the electric junction box. The circuitry means controls motor vehicle-on-board electric instruments installed on the motor vehicle. The combination meter is removably installed on an outer wall.

According to a second aspect of the present invention, there is provided a meter-module further comprising a guide groove for engaging with the combination meter. The guide groove, which is formed on the upper portion of the outer wall of the electric junction box, has a thin, flat board-like configuration. The guide groove is directed in the same direction as the connecting direction of the connectors wherein the electric junction box is removably combined with the combination meter in such a manner that a guide projection provided on the combination meter is easily engaged with the guide groove.

According to a third aspect of the present invention, there is provided a meter-module comprising the guide groove for engaging with the combination meter. The guide groove, which is formed on the upper portion of the outer wall of the electric junction box, has a thin, flat board-like configuration. The guide groove is directed in the same direction as the connecting direction of the connectors, and a flexible actuating lever for fastening the guide projection to the guide groove having an actuating portion which is projected toward the engaging side of the combination meter.

According to a fourth aspect of the present invention, there is provided a meter-module wherein the meter-module is installed in a finish panel on which the instrument panel is installed so as to constitute the meter-module assembly.

As stated above, in the meter-module according to the present invention, connectors are provided for the outer wall of the electric junction box in such a manner that the connecting direction of the connectors is linear and in the same direction. The circuitry means, including the meter and indication lamp etc., is incorporated into the electric junction box. The circuitry means controls motor vehicle-on-board electric instruments installed on the motor vehicle. The combination meter is removably installed on the rear wall of the instrument panel. The installation and removal of both the combination meter and the switch unit with respect to the meter-module are quickly and easily performed by a manipulation in the same direction. Therefore, the assembly maintenance and inspection of the meter-module, are simplified. Accordingly, an improvement in productivity and reduced cost can be achieved.

In particular regard to the flexible actuating lever, the actuating portion of the lever is directed to the engaging side of the combination meter. The flexible actuating lever cooperates with the guide groove formed on the electric junction box to retain the combination meter. The operation efficiency is remarkably improved, since the installation and removal of the combination meter is carried out by a simple manipulation involving pushing the actuating lever with respect to the combination meter.

Further, the present invention provides a meter-module assembly comprising a combination meter on which meters, various types of indication lamps and the driving circuits therefor are mounted; an electric junction box including a power source to motor vehicle-on-board electric instruments, various types of indication lamps and a circuitry means for allocating the input and output signals and for controlling thereof; and a switch-unit including various types of switches for motor vehicle-on-board electric instruments. The combination meter, the electric junction box and the switch-unit are compactly and integrally formed. Accordingly, the meter-module is lightweight and can also be miniaturized, and the arrangement of the wiring harness is simplified. Advantages derived from the invention include that it is suitable for varied production. The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENT

Figure 1:
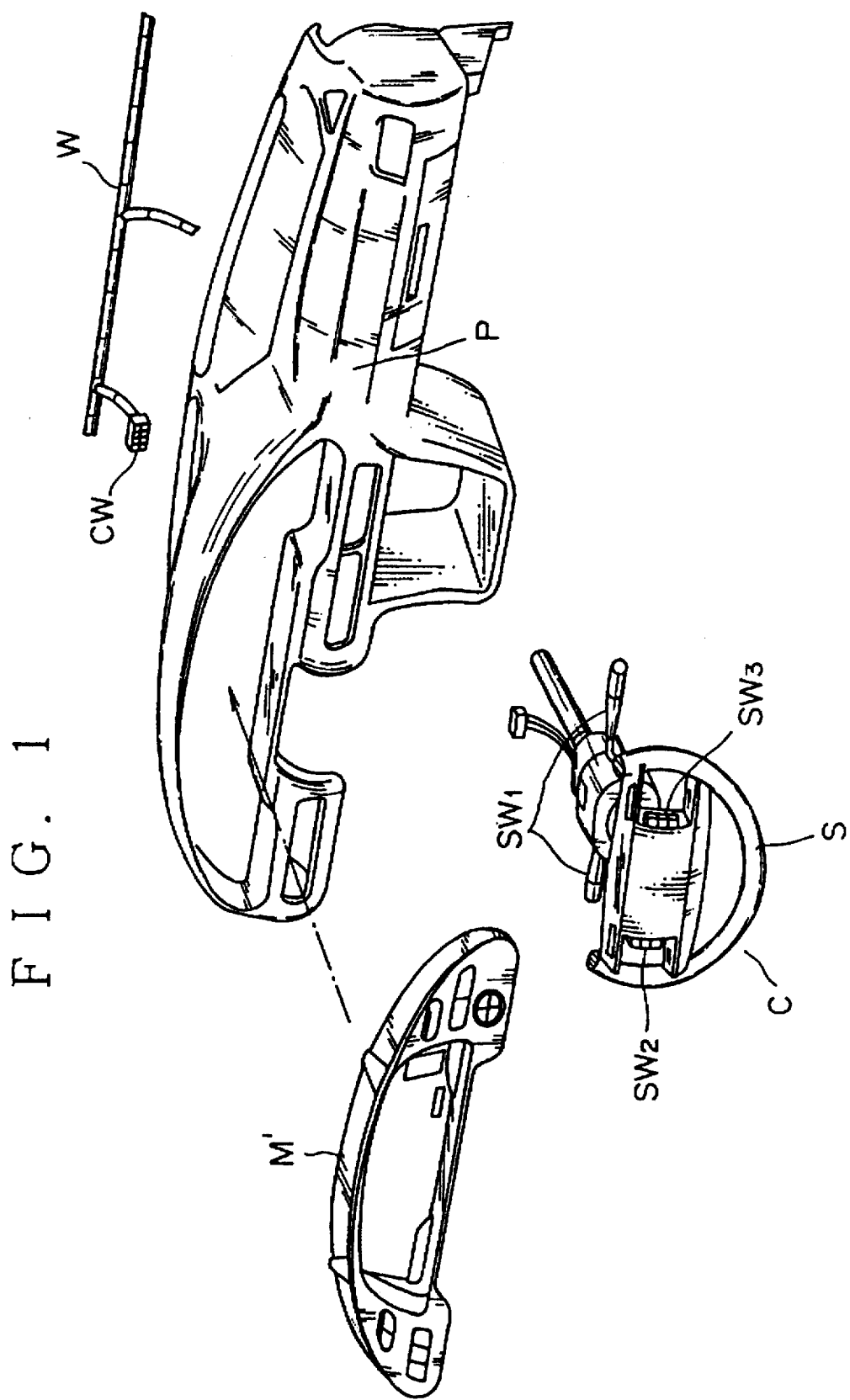
FIG. 1 is a perspective view showing an embodiment of a meter-module assembly M' which is shown separated from an instrument panel P according to the present invention.
Figure 2:
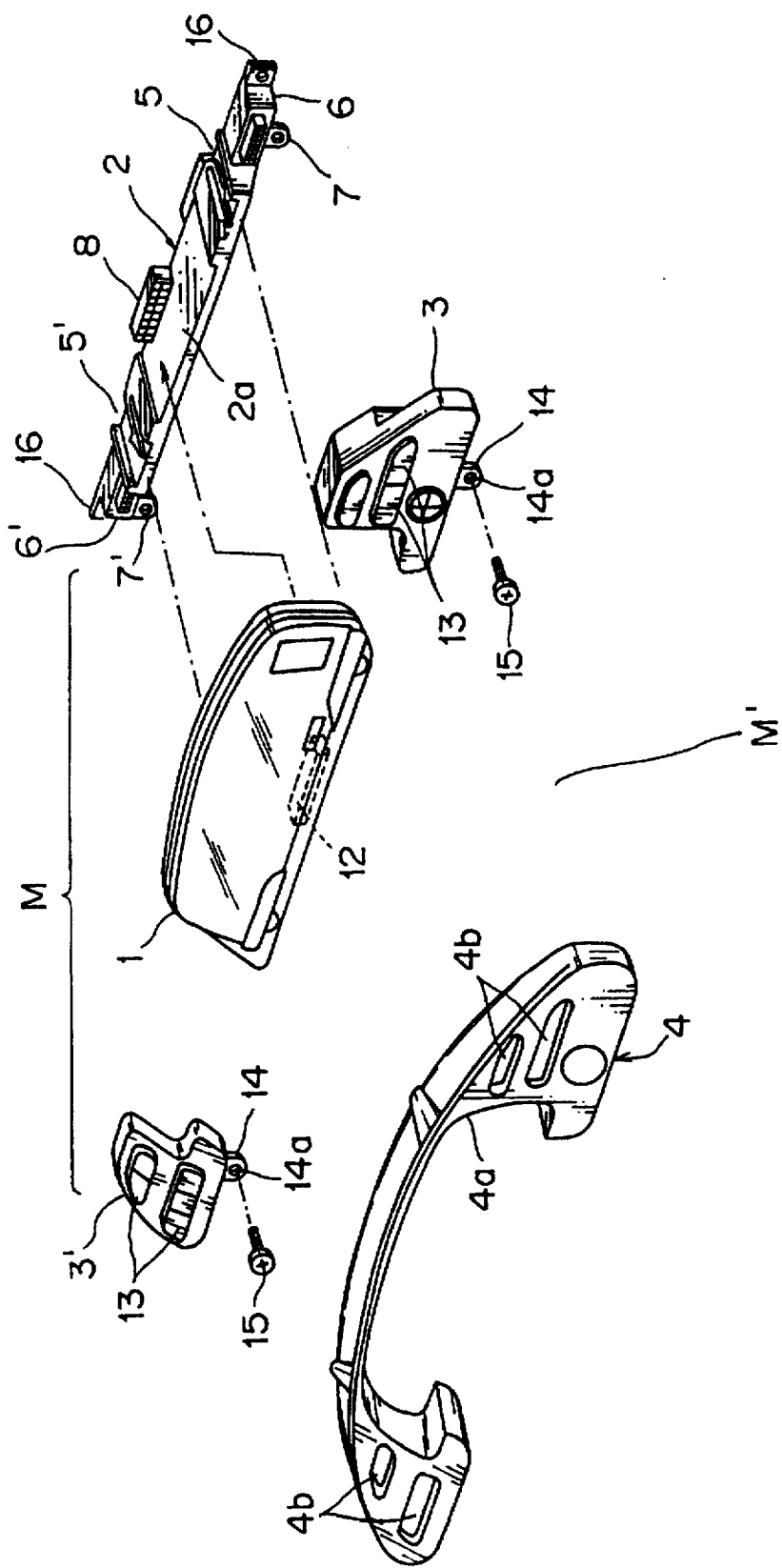
FIG. 2 is an exploded perspective view showing the meter-module assembly M' of FIG. 1.
Figure 3:
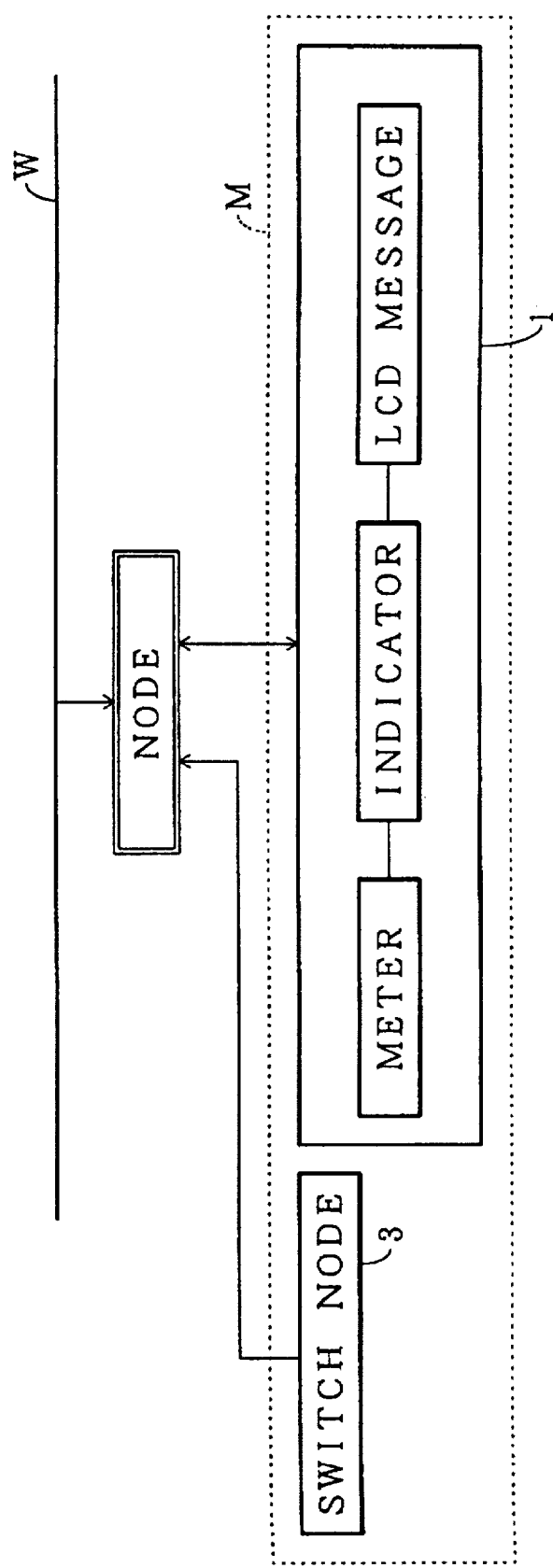
FIG. 3 is system block diagram representing the meter-module in FIG. 2.

FIG. 1 is a perspective view of an embodiment of a meter-module assembly M' shown separated from an instrument panel according to the present invention. FIG. 2 is an exploded perspective view of a meter-module M. FIG. 3 is a system block diagram of the meter-module.

In these figures, a steering assembly S, which is provided with a meter-module assembly M' and a column switch assembly C, is installed on the front of an instrument panel P. An instrument panel harness W is installed into the rear of the instrument panel P. In the column switch assembly C, the switches, such as a horn switch $SW_2$, tilting/telescoping switch $SW_3$, and so forth, are installed. A multi-function switch $SW_1$ is provided on both sides of the column. The input and output signals for these switches are electrically connected to the electric junction box 2 which is integrally formed with the meter-module M.

As shown in FIG. 2, the meter-module assembly M' is formed in a manner that the meter-module is installed into a finish panel 4 and is attached to the instrument panel P. The meter-module M comprises a combination meter 1 including meters, indication lamps and driving circuits thereof, a power source for motor vehicle-on-board electric instruments, an electric junction box 2 including circuitry means for distributing input and output signals for control thereof, and a pair of switch units 3, 3' including switches operative with the motor vehicle. The combination meter 1, the electric junction box 2 and the switch units 3, 3' are integrally and compactly formed.

The electric junction box 2 has a thin flat board-like box-type configuration. The electric junction box 2 comprises a circuitry means of the combination meter 1 for controlling the meters and the indication lamps, and so forth. At an outer wall 2a on the upper part of the electric junction box 2, wedge-shaped guide grooves 5, 5' for engaging the combination meter 1 are formed. On the left and right ends of the junction box 2, connectors 6, 6' are provided which connect to the switch units 3, 3'. The connectors are attached in a manner that the connecting portion of the connectors 6, 6'are directed forward. There are provided holes 7, 7' in the junction box 2 for fixing the respective switch units 3, 3'. In the intermediate portion of the electric junction box 2 a connector 8, which is adapted to connect with the combination meter 1, protrudes in the manner that the connecting portion thereof is faced in the same direction as the connectors 6, 6'. Moreover, connecting directions of both the connectors 6, 6' and the connector 8 are the same as the direction of guide grooves 5,5'.

Figure 4:
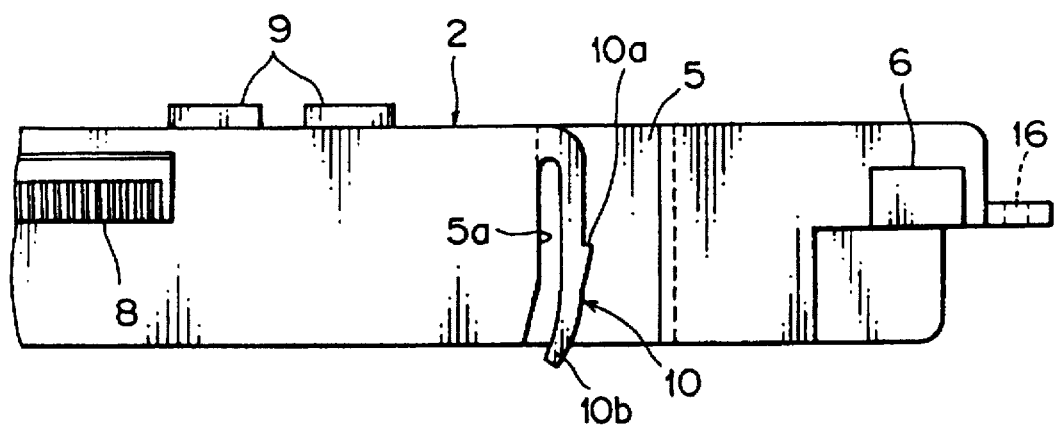
FIG. 4 is a plan view showing essential portions of an electric junction box as shown in FIG. 2.

A connector 9 which connects to a connector CW for the instrument panel harness W is provided on the rear of the electric junction box 2. Further, at the sidewall 5a of the guide groove 5, and similarly with regard to the other guide groove 5', as shown in FIG. 4, a flexible actuating lever 10 having an engaging claw 10a for fixing the combination meter 1 is provided in the manner that the actuating portion 10b is projected toward the rear or installing side of the combination meter 1.

Figure 5:
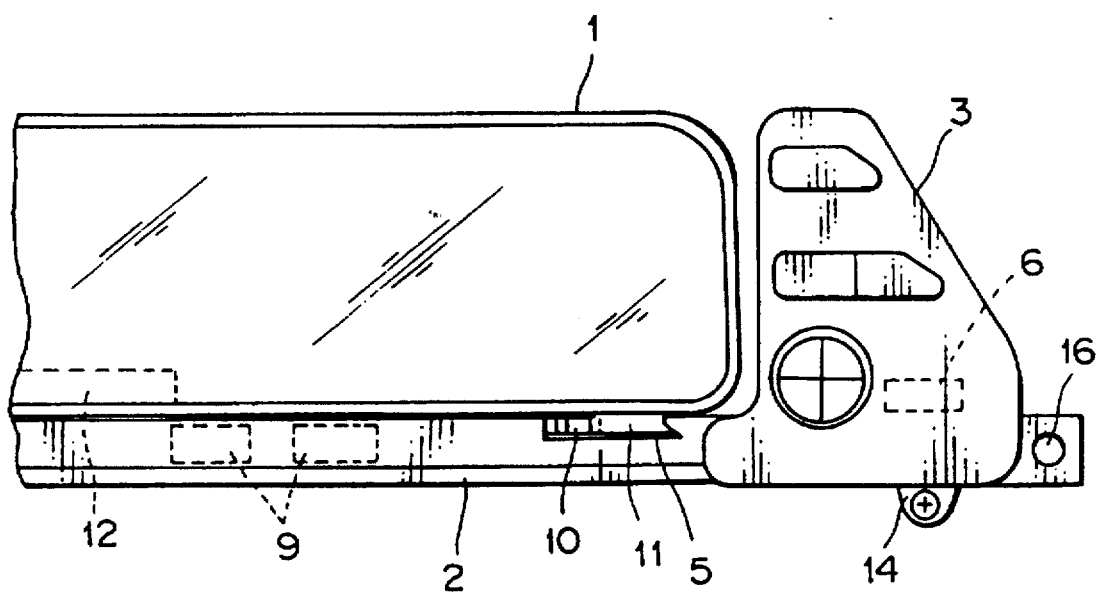
FIG. 5 is a side view showing essential portions in which a combination meter, a switch unit and the electric junction box are integrated.

On the outside lower part of the combination meter 1, as shown in FIG. 5, two guide projections 11 (only one of two being illustrated) cooperable with the guide grooves 5, 5' are formed for the electric junction box 2. In the intermediate lower part, a connector 12, which is connected to the connector 8 of the electric junction box 2, is provided.

When the guide projection 11 of the combination meter is inserted into the guide grooves 5, 5' of the electric junction box 2 and is slidingly moved therealong, the guide projections 11 enter the guide grooves while flexibly extending the engaging claws 10a of the actuating levers 10 laterally. When the terminal portion of the guide projection 11 passes beyond the engaging claw 10a, the engaging claw 10a fastens the combination meter 1 to the electric junction box 2. Fastening is accomplished by the engaging claw 10a returning to its unflexed position by virtue of the elastic recovery of the material whereby the terminal portion of the guide projection 11 is hooked by the engaging claw 10a. At this time, the connector 8 and the connector 12 are fitted and electrically connected with each other.

When removing the combination meter 1 from the electric junction box 2, the actuating portion 10b of the actuating levers are laterally extended by pushing them in the direction such that the guide grooves 5, 5' are enlarged. As a result, the engagement by the engaging claws 10a is removed from the terminal portion of the respective guide projections 11. Accordingly, the combination meter 1 can be simply removed from the electric junction box 2 by extracting the combination meter 1 therefrom.

Various operating switches 13 are installed on the front side of the switch units 3, 3'. At the lower portion thereof a mounting portion 14 having a mounting hole 14a is formed. The switch units 3, 3' are fastened by tightening screws 15 into the fastening holes 7 of the electric junction box 2.

The meter-module M is integrally formed in such a way that the combination meter 1 and the switching units 3, 3' are installed in the electric junction box 2. The meter-module assembly M' is formed by fastening the engaging parts (not illustrated) at both ends of the finish panel 4 to the panel-fastening hole 16 provided at both ends of the electric junction box 2 by virtue of tightening the screw.

The finish panel 4, which comprises an indication window 4a for the combination meter 1 at an intermediate portion thereof and indication windows 4b for the switch units at both ends thereof, is a faced panel installed in the designated position at the inside of the instrument panel P.

Figure 6:
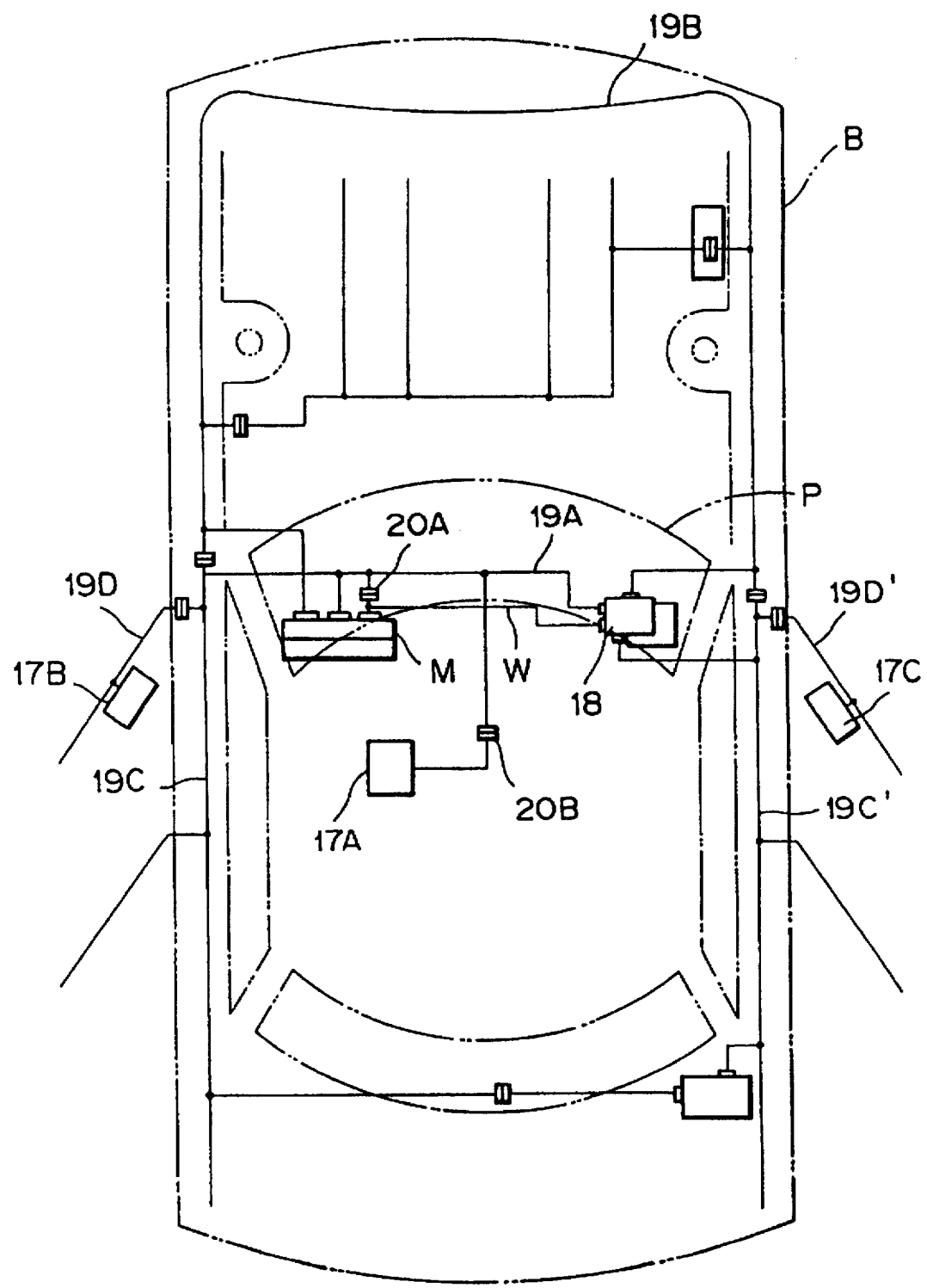
FIG. 6 is a schematic illustration showing an example of an arrangement configuration for an internal wiring harness for a motor vehicle by using the meter-module in FIG. 2.

FIG. 6 is a schematic illustration of an example of an arranging configuration for an internal wiring harness of a motor vehicle by using the meter-module M.

In FIG. 6, reference numerals 17A –17C indicate circuit controlling units or the electric junction boxes, and 18 is the main electric junction box including a plurality of fuses and relays.

The meter-module M is installed in the left side of the instrument panel P. The above-stated main electric junction box 18 is installed in the right side thereof. A seat-module 17A for controlling various optional motor vehicle-on-board electric instruments is installed in its mid-position. A door-module 17B for the driver is installed in the left side door. The door-module 17C for a supplementary seat is installed in the right side door.

Reference numeral 19A indicates a cowl side wire harness, 19B an engine room main wire harness, 19C, 19C', floor wire harnesses, 19D, 19D' door wire harnesses, and respectively, indicate 20A, 20B female and male connectors.

Figure 7:
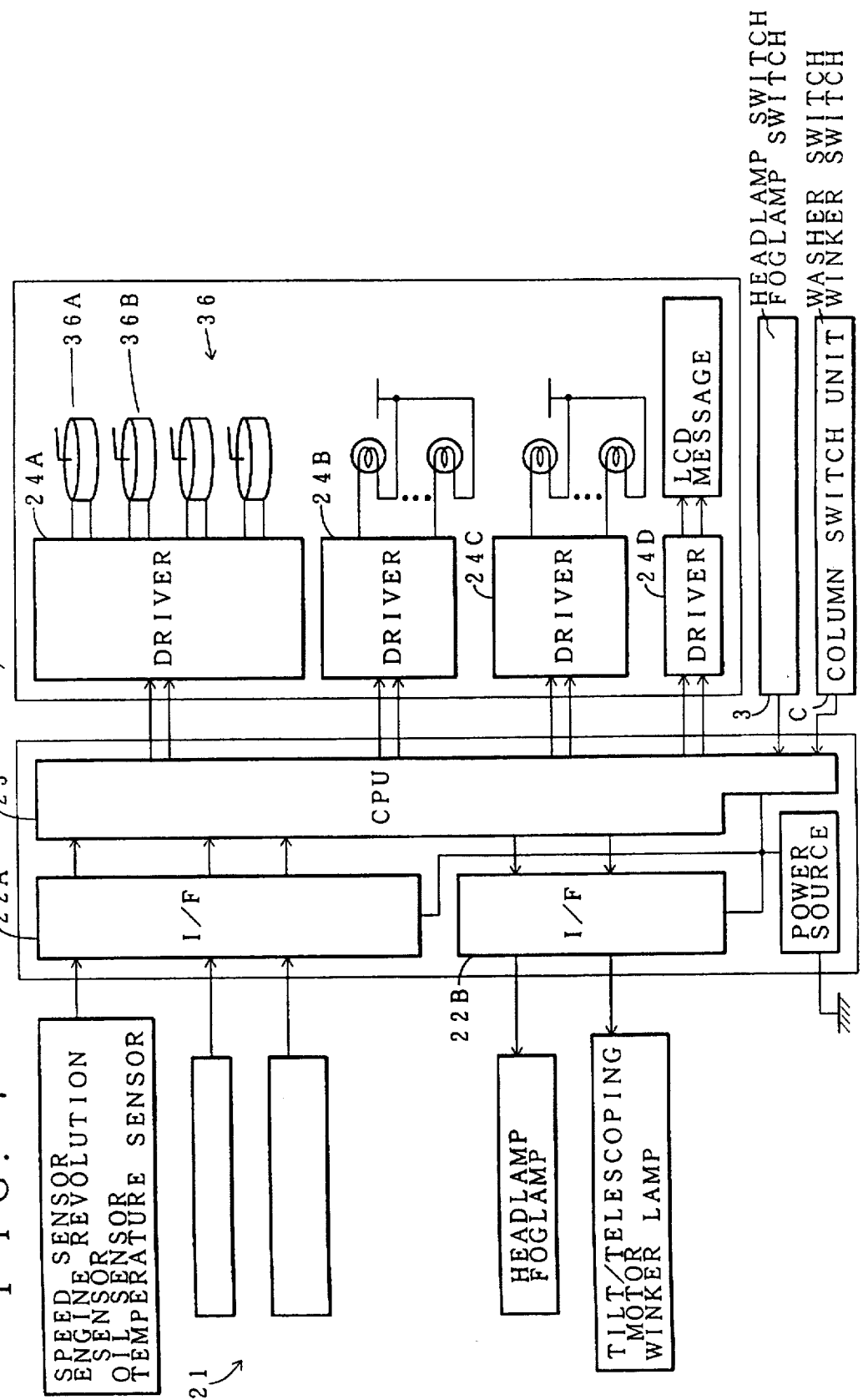
FIG. 7 is a block wiring diagram representing the meter-module diagram of FIG. 2.
Figure 8:
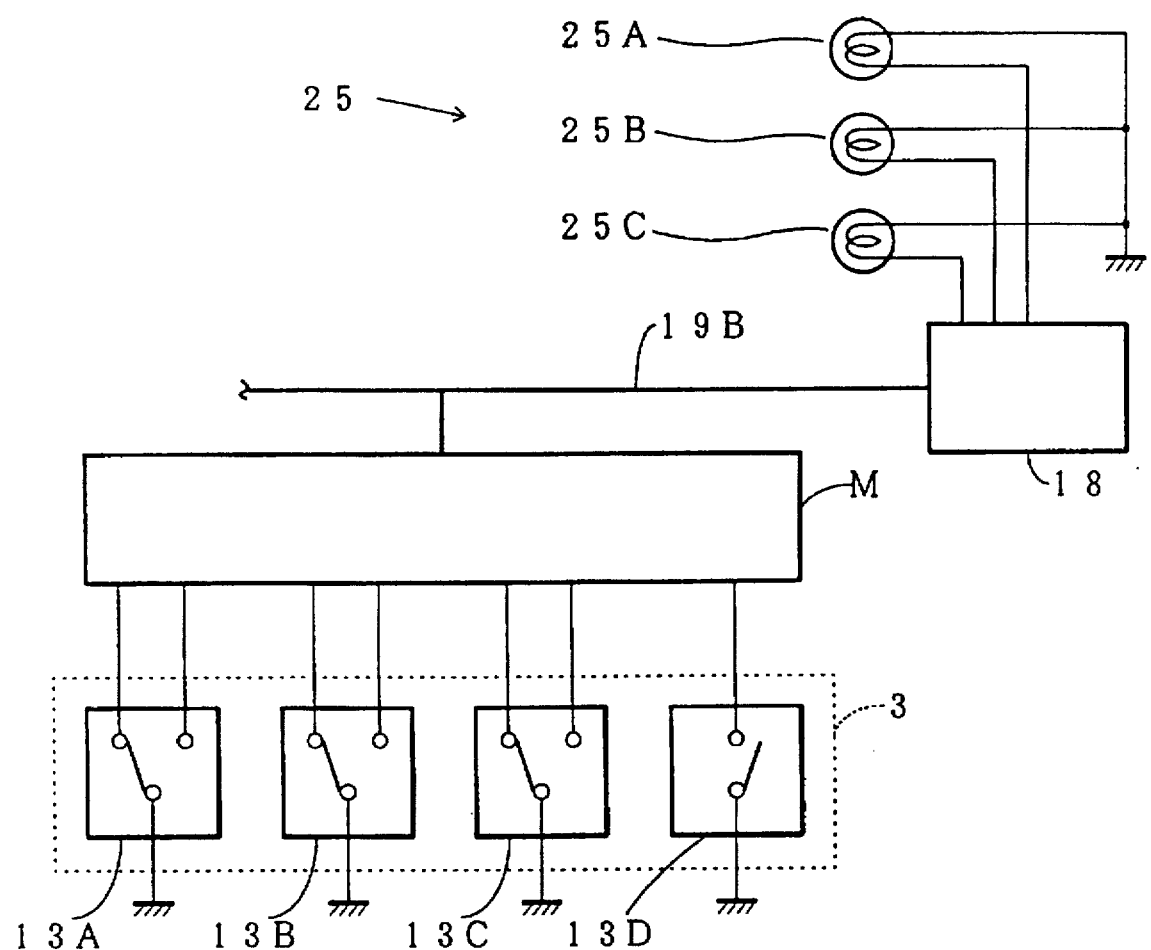
FIG. 8 is a wiring diagram showing a switch circuit section as shown in FIG. 7.

FIG. 7 is a block wiring diagram of the meter-module M.
FIG. 8 is a wiring diagram of a switch circuit section of the meter-module M.

In FIG. 7, reference numeral 21 designates various signal-generating means, 22A an input interface (hereinafter designated as I/F) circuit, 22B an output I/F circuit, 23 a central processing unit (hereinafter designated as CPU), and reference numerals 24A–24D indicate various driving circuits.

A circuitry means comprising a converter for converting the signals which are transmitted by multiplex transmission, is installed in the electric junction box 2. Both the circuitry means and the electric junction box 2 are integrally formed. Various switches 13A–13D, which are connected to the CPU, are integrated as the switch unit 3, 3'. The electric junction box 2 and the switch unit 3, 3' both are directly connected with the CPU 23. Accordingly, it is not necessary to provide a sub-harness.

In FIG. 8, reference numerals 25A–25C designate headlamps, fog lamps, and so forth, such as various types of lamps 25.

Figure 9:
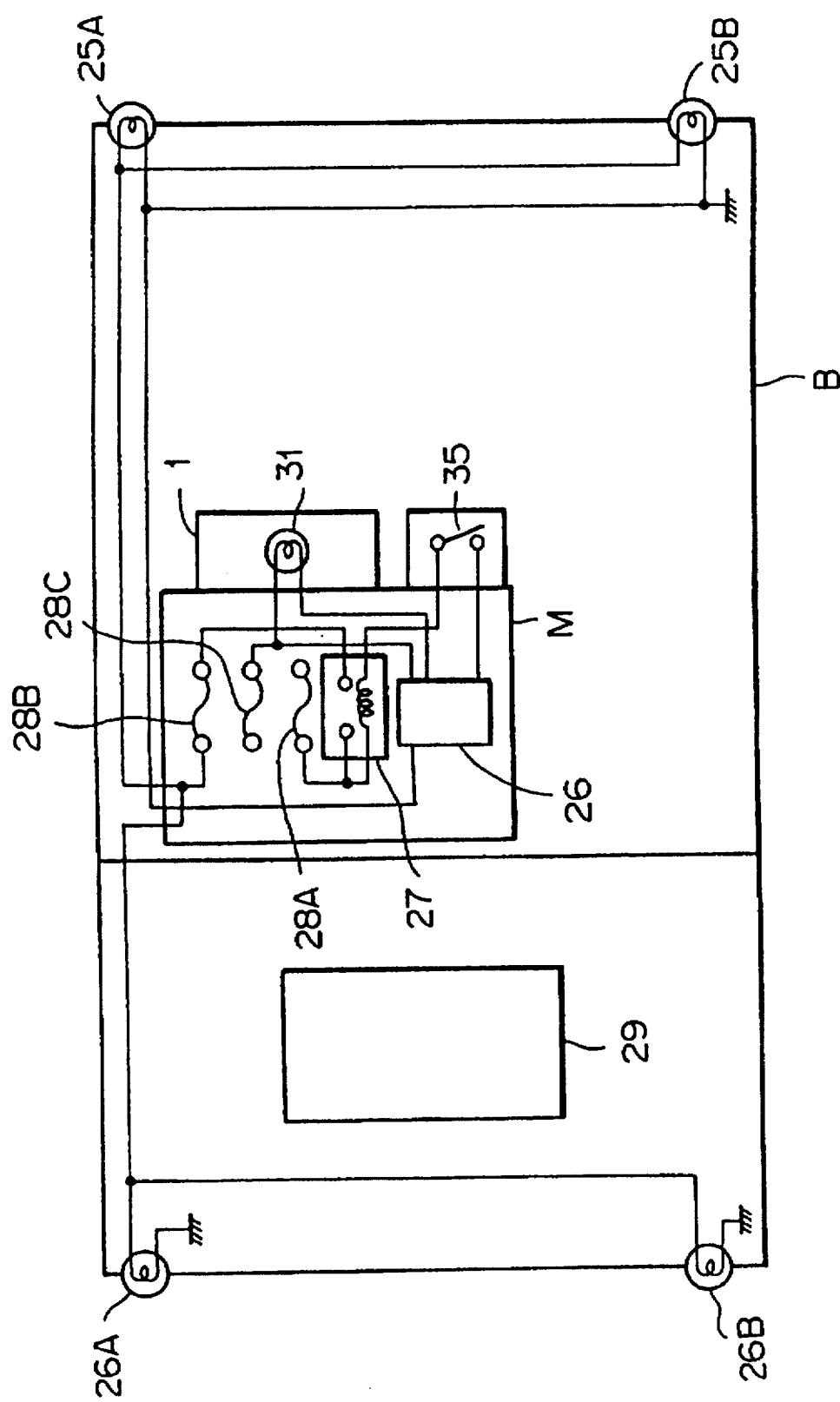
FIG. 9 is a wiring diagram showing an example of an internal wiring of a motor vehicle in which the meter-module shown in FIG. 2 is used.
Figure 10:
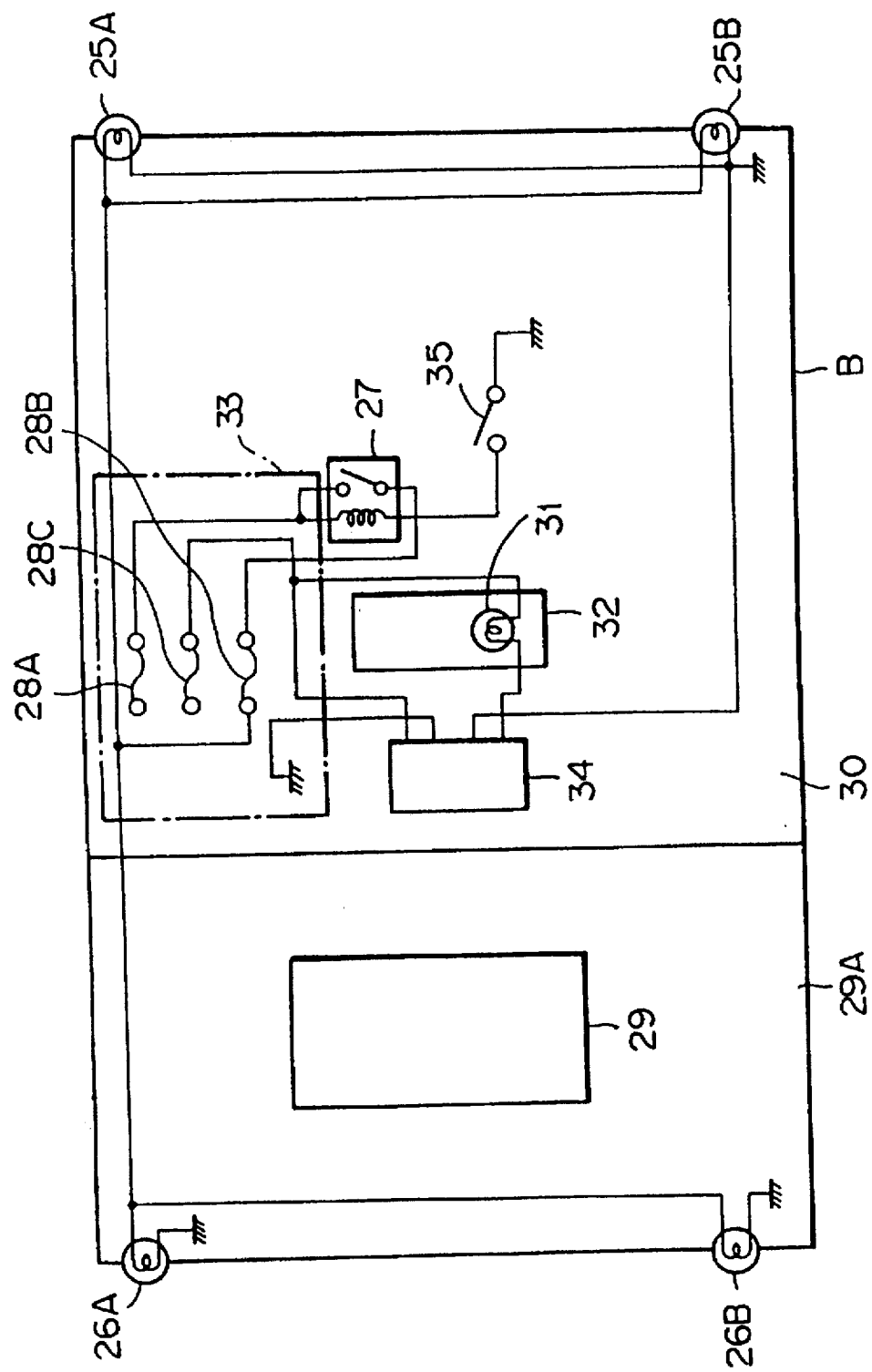
FIG. 10 is a conventional wiring diagram corresponding to the wiring shown in FIG. 9.
Figure 11:
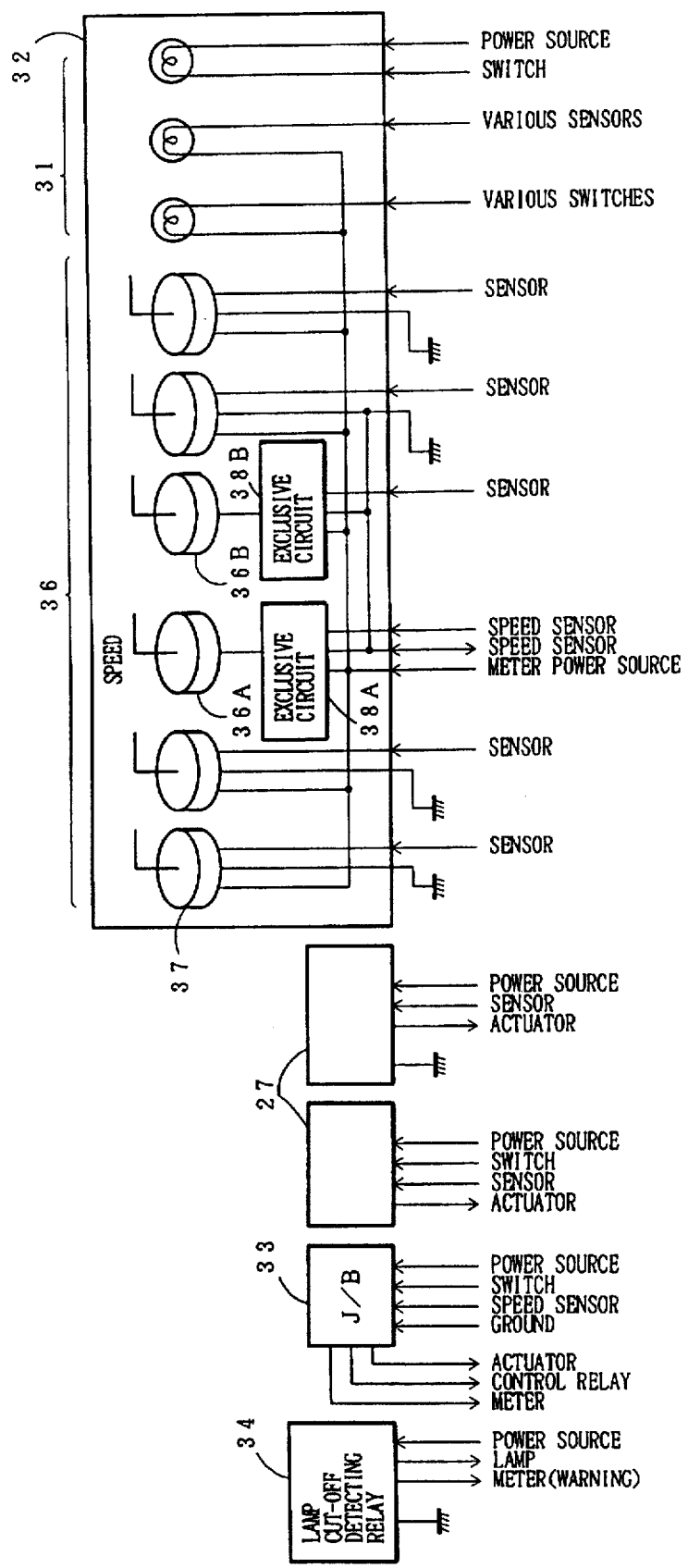
FIG. 11 is a conventional block wiring diagram showing a combination meter, a relay and an electric junction box.
Figure 12:
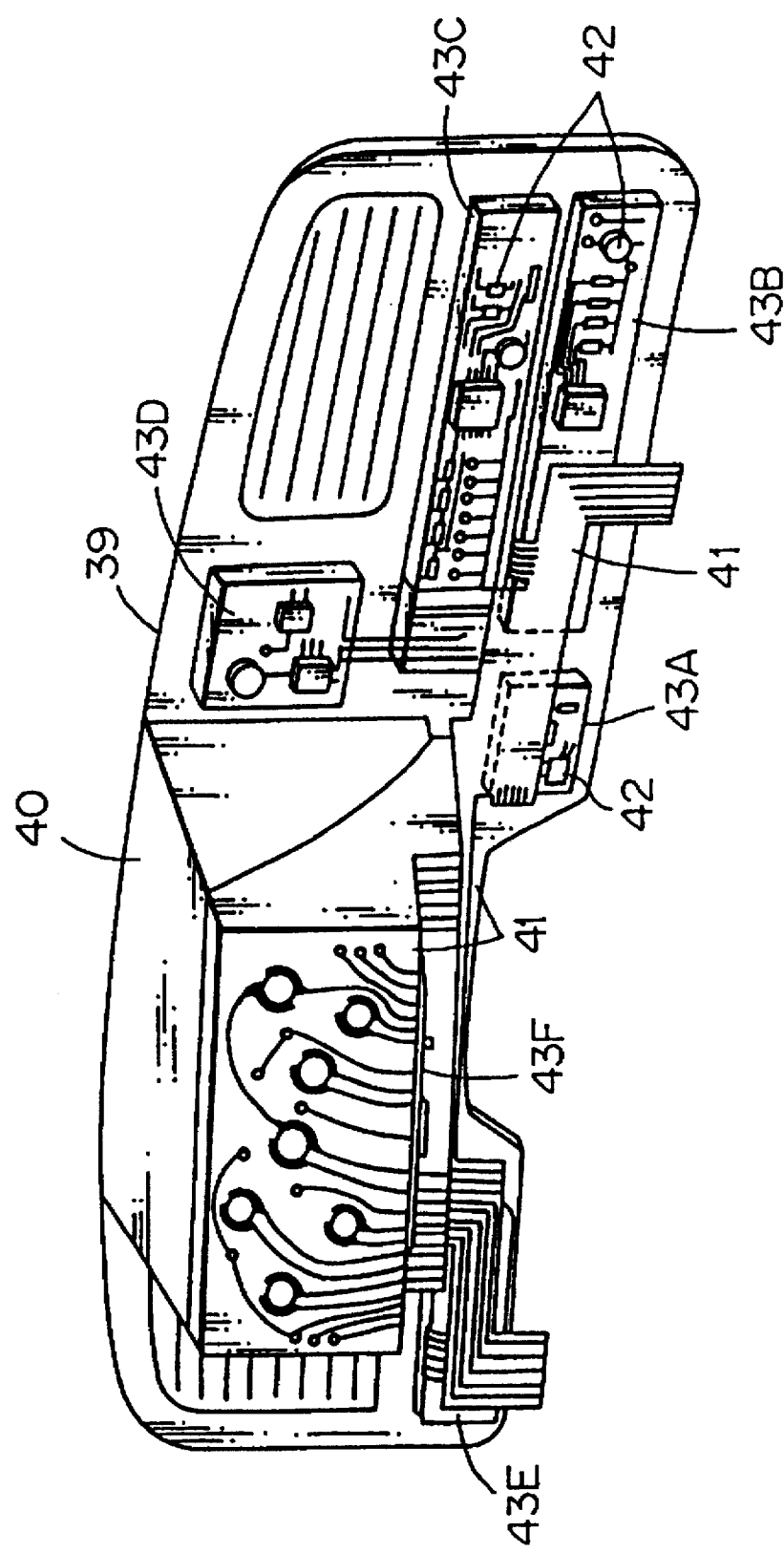
FIG. 12 is an explanatory view showing a constitution for an electric circuit of the conventional instrument panel section.

FIG. 9 is a wiring diagram of a tail-lamp system using meter-module M according to the present invention. The tail-lamp system of FIG. 9 is compared with FIG. 10 which is shown as a conventional tail-lamp system. A tail-lamp cut-off detecting relay 26, a tail-relay 27 and fuses 28A–28C are compactly provided for the one meter-module M. Therefore, it is clear that the number of electric wiring lines can be reduced.

The installation for the meter-module assembly M' in the instrument panel P is performed by the following procedures.

The meter-module assembly M' is fitted and fastened to the front of the instrument panel P. The connector 9 on the rear of the electric junction box 2 is connected to the connector CW of the instrument panel harness W. Then, terminal connectors (not illustrated) in respect to the cowl side wiring harness 19A, the engine space main wiring harness 19B, and so forth, are connected.

As stated above, it is very simple to assemble the meter-module, and to install the meter-module assembly M' in the instrument panel P, and to electrically connect various wiring harnesses W, 19A, and 19B.

It will be appreciated from the foregoing description that, in the meter-module according to the present invention, connectors are provided for the outer wall of the electric junction box in such a manner that the connecting direction of the connectors is linear in an identical direction. The circuitry means, including the meter and indication lamp etc., is incorporated into the electric junction box. The circuitry means controls motor vehicle-on-board electric instruments installed on the motor vehicle. The combination meter is removably installed on the rear wall of the instrument panel. The installation and removal of both the combination meter and the switch unit with respect to the meter-module are quickly and easily performed. Therefore, the assembly of the meter-module, the operation of maintenance and the check are simplified. Accordingly, an improvement in productivity and a reduction in cost can be achieved.

In particular, the flexible actuating lever is provided for the guide groove formed on the electric junction box. The flexible actuating lever uses an actuating portion which is directed to the engaging side of the combination meter. The operation efficiency is remarkably improved, since the installation and removal of the combination meter with respect to the meter-module is carried out by simple manipulation of pushing the actuating lever.

Further, the combination meter, the electric junction box incorporating the circuitry means for controlling the meters and the indication lamps, and the switch-unit are intensively and integrally formed. Accordingly, the meter-module is lightweight and can be miniaturized, and the arrangement of the wiring harness is simplified. Therefore, the subject matter described herein creates advantages that are suitable for several varieties of production.

What is claimed is:

1. A meter-module comprising:

a combination meter, including a body containing a plurality of meters, indicators, lamps and driving circuits therefor;

an electric junction box having generally rectangularly disposed walls and containing a power source and circuitry means for allocating input and output signals and control thereof with respect to said meters, indicators, lamps and driving circuits of said combination meter;

a first connector provided on said body of said combination meter and a second connector provided on said electric junction box, said first and second connectors being disposed in mutual alignment and cooperating to effect interconnection thereof when said combination meter is slidingly moved with respect to a surface of a wall of said electric junction box, and guide means for guiding the movement of said combination meter with respect to said electric junction box, said guide means including guide groove means formed on one of said combination meter and said electric junction box, and guide projection means configured to slidingly engage said guide groove means formed on the other of said combination meter and said electric junction box, said guide groove means and said guide projecting means being formed on facing surfaces of said combination meter and said electric junction box, respectively, and being directed to effect interconnection of said first and second connectors when said facing surfaces of said combination meter and electric junction box are slidingly moved with respect to each other.

2. A meter-module according to claim 1, wherein the guide groove for engaging with the combination meter is formed on the upper of an outer wall of the electric junction box and wherein said guide groove contain a flexible actuating lever for fastening the guide projection to the guide groove, said actuating lever having a locking portion which is projected toward the engaging side of the combination meter and engageable with a guide projection thereon.

3. A meter-module according to claim 1 or claim 2, wherein said meter-module is installed in a finish panel on which the instrument is installed so as to constitute the meter-module assembly.

* * * * *